Patented July 4, 1950

2,514,141

UNITED STATES PATENT OFFICE 2,514,141

POLYESTER RESIN ADHESIVE COMPOSITIONS

Dorothea S. Phillips, Greenwich, Conn., assignor to American Cyanamid Company, New York, N. Y., a corporation of Maine No Drawing. Application January 2, 1948, Serial No. 346

6 Claims. (Cl. 260—40)

This invention relates to gap-filling adhesives for electrical applications comprising a casting resin. More specifically, this invention relates to a filled polyester resin for cementing component parts of electrical devices.

In the manufacture of high voltage insulators, the usual procedure is to join a metallic cap and eye-bolt to a cylindrical porcelain member with cement casting. Although this procedure is satisfactory from a strength viewpoint for most applications, it requires a minimum of a week to cure satisfactorily, before the insulator is ready for shipment. By the utilization of this invention, using polyester resin adhesives in lieu of cement, the articles are completed in a matter of minutes. Another application of this invention is the joining of metal bases of vacuum and radio tubes, and electrical incandescent and fluorescent light bulb fixtures.

According to the teachings of this invention, an unsaturated polyester resin is admixed with a relatively inert fine granular filler having a volatile contained therein, and preferably adsorbed by at least one component of the inert filler. The composition is preferably catalyzed with an organic peroxide and accelerated with a satisfactory accelerator such as stannous chloride. In the event that fire-proofing agents are required, a fire-proofing agent such as antimony trioxide may be included in the formulation. The inert filler may include any of the satisfactory small granular, and preferably siliceous materials in admixtures, but it is preferable to include as a portion of the mixture fuller's earth, as it is a most convenient method of incorporating moisture into the mixture as adsorbed water.

When curing such a resinous composition, the adsorbed water is expanded either by the exothermic heat due to the reaction when hydroperoxide cold setting catalysts are employed, such as the 1-hydroxy cyclo-hexyl hydroperoxide-1, or by the external heat applied when thermosetting catalysts are employed. The expansion of the water due to its volatilization firmly sets the resinous composition in a gelled condition so that, upon further curing, the bond is securely effected, the dimensional characteristics remain unchanged, and the tensile strength is unimpaired. In addition thereto, the resultant cured resinous bond has an extremely high water resistance, such that trouble normally due to humidity in prior art cements are eliminated; and, for insulator applications, the electrical properties of the cured resin render it particularly applicable.

A preferred feature, if not essential feature, is the cure cycle in setting the casting or cementing resin before the exothermic cure is effected. In this manner, the resin is first gelled to effect the desired dimensions, and then cured; and, as previously stated, the presence of the volatile, which is preferably adsorbed, and is a non-reactive liquid, exerts internal pressure on the material during cure, thereby eliminating the shrinkage for castings where dimensional tolerances are required.

A satisfactory formulation and method of application is as follows: 100 parts of an ethylene glycol-diethylene glycol-tetrachlorophthalic-fumarate resin cut with monomeric styrene in the ratio of 4:1, 1.5 parts of a 50% benzoyl peroxide in tricresyl phosphate solution, 0.27 parts of a 37% stannous chloride in ethylene glycol solution, a filler comprising 100 parts of 50–70 mesh casting sand and 80 parts of fuller's earth containing 10% adsorbed water based on weight of fuller's earth, and a fire retardant agent of 10 parts antimony trioxide. In mixing this formulation, the benzoyl peroxide catalyst and stannous chloride accelerator are added to the unsaturated polyester resin-styrene solution, and stirred into solution. The life of this catalyzed and accelerated resinous solution is well in excess of 24 hours. When the resin is to be used, the sand, fuller's earth, and antimony trioxide are then added and stirred until a smooth paste results. The life of this casting adhesive mixture at room temperature is approximately 45 minutes.

In order to obtain the preferred results, the following cure cycle is recommended, and if not essential, it is at least a preferred two-stage cure cycle. The first stage is accomplished at room temperature or slightly elevated temperatures, to set the mixture to a firm gel in conformity with the configurations pertaining to the particular application. The second stage is accomplished by heating the casting to a temperature high enough to effect the exothermic reaction characteristics of this type of resin. A typical cure cycle would be approximately 2 hours at 75° F., followed by 2 hours at 180° F.

Castings, or as it may be properly defined, adhesive bonds prepared by the above procedure, and with the above formulation have no visible signs of shrinkage or swelling, are hard and shock resistant, and have tensile strength in excess of 10,000 pounds. The surfaces against the casting molds or objects bonded are smooth, although the interior of the casting has many small holes, due to the expansion of the volatile liquid, when set by volatile force. When this formulation was employed in cementing metallic caps and eyebolts, to cylindrical porcelain members, the failure of the resultant insulator when tested for tensile strength, was in the porcelain body, and not in the bond line.

Variations in the ratio of sand and fuller's earth in the formulations, do not appear to influence the tendency of the polyester resin to change dimensions during cure. The fuller's earth has a catalyzing effect on the formulation, and is a phenomenon believed to be due to the volatile adsorbed on the surface. The quantity or proportion of sand to fuller's earth has been varied from all sand to all fuller's earth. Some shrinkage was evident when all sand was used, apparently because there was no volatile in the sand, or adsorbed on the surface thereof; as such, all sand filler castings are unsatisfactory for most applications, even when the two-stage cure cycle is employed.

By increasing the proportion of fuller's earth to sand, the gelling time is extremely shortened, and the strength of the casting is in no way affected by the pre-gel cycle in the two-stage cycle. The addition of an accelerator causes the formulation to gel at room temperature, and reduces the tendency towards shrinkage; in fact, satisfactory pre-gel is obtained when the stannous chloride accelerator is employed, and a temperature of approximately 75° F. is used. By increasing the temperature above that of 75° F., a shortened gelling cycle is obtained, but as the temperature is increased, care must be taken that gases formed in the casting do not swell excessively, or that the exothermic reaction is started before the resin is allowed to completely gel.

The first retardant or flame-resistant ingredients, such as antimony trioxide or chloropropane wax, are not essential ingredients for the casting, but are preferred to make the formulation self-extinguishing. However, any of the standard flame-resistant and fire-retardant materials may be incorporated, either alone or with these preferred materials.

When the above formulation was employed in cementing radio tubes to their bases, glass to metal bonds were produced which exceeded 15 inch pounds torque both dried, and after 18 hours soaking at 50° C. Furthermore, the humidity effects normally present using prior art cementing materials, did not pertain when the above formulation was employed.

Any of the unsaturated polyester resins may be employed in the preparation of formulations satisfactory in practicing this invention, and they may be conveniently prepared by reacting polyhydroxy alcohol, such as diethylene glycol, ethylene glycol, propylene glycol, and the like, or admixtures thereof with unsaturated dicarboxylic acids, such as maleic, fumaric, pthalic, and the like, and admixtures thereof, and for viscosity reasons, these unsaturated resins may be modified with mono-hydroxy alcohols, and mono basic acids, or the resultant resin may be cut with a copolymerizable resin such as styrene, and the unsaturated phthalic esters such as diallyl phthalate and the like. The copolymerizable solvent when employed with the unsaturated polyester resins, should preferably be one having the $CH_2=C<$ group, and having a boiling point above 100° C. Furthermore, the polyester resin may be modified with other synthetic resins, such as the thermosetting aminoplasts, methylated melamine-formaldehyde resins being examples.

In applications where external heat or radio frequency heat may be employed, any of the organic peroxide catalysts may be used, it being preferred, however, to employ a benzoyl peroxide. In installations or applications wherein external heat is not applicable, a cold-setting adhesive catalyst which will effect the pre-gel in the first stage of the cure cycle and then continue to generate sufficient heat for the exothermic reaction for final cure, should be employed. As a class, the hydroperoxides appear to be most satisfactory for this application, and it is preferred to use the 1-hydroxy cyclohexyl-hydroperoxide-1. The inert or non-reactive filler is preferably siliceous, and of a particle size of 100 mesh or finer, and preferably a blend of sand of 50–70 mesh and fuller's earth having the volatile adsorbed. From an exothermic viewpoint, it is not essential that the fine fuller's earth be employed as all of the filler. However, since sand does not adsorb the volatile, it is preferred that at least 20%, and preferably approximately 40% of the filler be fuller's earth, and that the volatile adsorbed therewith be approximately 10%, based on fuller's earth, although, as the proportion of the fuller's earth is increased, the percentage of adsorbed water, based on fuller's earth, may be decreased for optimum results. The volatile, as illustrated in the above formulations, is preferably water wholly from an economic consideration. If, however, from specific applications, low temperatures are employed, or extremely high temperatures are employed, because of some other feature of the application, other volatiles which are non-reactive may be satisfactorily employed, as it is believed that the internal pressure exerted by volatilization creates the desired effect.

In order to control to the optimum, the shrinkage of a formulation during and after curing, the two preferred features, both being interrelated, are as follows: (1) The two-stage cure cycle is required for most applications, and is preferred in all applications. The low temperature stage is preferred to firmly gel the resin in the mold or between the articles to be molded before subjecting the casting or bonding assembly to a temperature high enough to effect the exothermic reaction characteristics of the resin. The first stage can be accomplished at room temperature with catalyst, and with or without accelerator, but the time for gelation is several days in the absence of this accelerator, whereas in the presence of this accelerator, the gelation is obtained in a period of 40–45 minutes. As previously pointed out, gelation is also shortened by increasing the temperature, but certain dangers that should be avoided are encountered by so doing. (2) The second preferred feature in this invention is that the volatile is dispersed throughout the mixture, and is adsorbed on the fuller's earth, and is present in an amount of approximately 10% based on the fuller's earth, or about 2.7% based on the total weight of the mix for the preferred formulation. The volatile, or as preferred for economic reasons, water, being incompatible with the resin, vaporizes during the second stage of the cure, to exert sufficient internal pressure to counteract the tendency to shrink. Any compatible liquid having a volatilization point near that of water or the curing conditions of the resin may be used to obtain this internal pressure. Water is particularly desirable in that its presence helps to accelerate the gelation of the resin during the first stage of cure, particularly when stannous chloride is employed, and due to the fact that the water is adsorbed on the fuller's earth, it is distributed completely and uniformly throughout the mix, whereas if added separately, the dispersion is not as complete and the casting has a tendency to swell during cure.

I claim:

1. An adhesive comprising an unsaturated polyester resin consisting of the reaction product of a polyhydroxy alcohol and an unsaturated dicarboxylic acid, an organic peroxide catalyst for said resin, and an inert filler containing at least 20% of fuller's earth and about 2.7% of adsorbed water based on the total weight of the mix.

2. An adhesive comprising an unsaturated polyester resin consisting of the reaction product of a polyhydroxy alcohol and an unsaturated dicarboxylic acid, an organic peroxide catalyst for said resin, and an inert filler comprising sand and fuller's earth in which said fuller's earth is present in an amount equalling at least 20% by weight of the total weight of the filler and containing about 2.7% of adsorbed water based on the total weight of the mixture.

3. An adhesive comprising an unsaturated polyester resin consisting of the reaction product of a polyhydroxy alcohol and an unsaturated dicarboxylic acid, a copolymerizable solvent therefor, said copolymerizable solvent having a $CH_2=C<$ group and having a boiling point above 100° C., an organic peroxide catalyst for said resin, an accelerator for said catalyst and resin, and an inert filler containing at least 20% by weight of fuller's earth and containing about 2.7% of adsorbed water based on the total weight of the mix.

4. An adhesive comprising an unsaturated polyester resin consisting of a reaction product of a polyhydroxy alcohol and an unsaturated dicarboxylic acid, a copolymerizable solvent therfor said copolymerizable solvent having a $CH_2=C<$ group and having a boiling point above 100° C., an organic peroxide catalyst for said resin, and an inert filler comprising sand and fuller's earth in which said fuller's earth constitutes at least 20% by weight of the total weight of the inert filler and containing about 2.7% of adsorbed water based on the total weight of the mixture.

5. An adhesive comprising an unsaturated polyester resin consisting of the reaction product of a polyhydroxy alcohol and an unsaturated dicarboxylic acid, an organic peroxide catalyst for said resin and an inert filler consisting of fuller's earth containing about 2.7% by weight of adsorbed water based on the total weight of the mixture.

6. An adhesive comprising an unsaturated polyester resin, consisting of the reaction product of a polyhydroxy alcohol and an unsaturated dicarboxylic acid, a copolymerizable solvent therefor, said copolymerizable solvent containing a $CH_2=C<$ group and having a boiling point above 100° C., and an organic peroxide catalyst for said resin, an accelerator for said catalyst and resin, and an inert filler consisting of fuller's earth containing about 2.7% by weight of adsorbed water based on the total weight of the mixture.

DOROTHEA S. PHILLIPS.

REFERENCES CITED

The following references are of record in the file of this patent:

UNITED STATES PATENTS

| Number | Name | Date |
| --- | --- | --- |
| 1,873,776 | McNeil et al. | Aug. 23, 1932 |
| 2,125,594 | Strauch | Aug. 2, 1938 |
| 2,406,298 | King | Aug. 20, 1946 |
| 2,414,125 | Rheinfrank | Jan. 14, 1947 |